Figure 1:
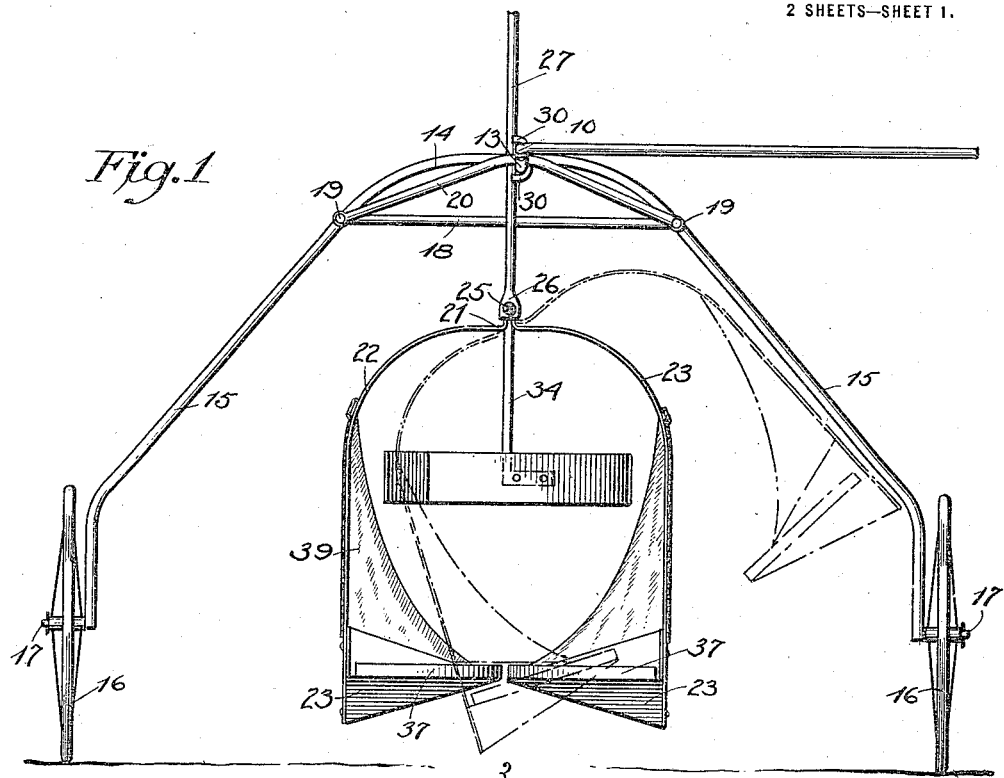

O. F. BLEDSOE, Jr.
MACHINE FOR CATCHING BOLL WEEVILS.
APPLICATION FILED SEPT. 22, 1914.

1,151,437.

Patented Aug. 24, 1915.
2 SHEETS—SHEET 1.

WITNESSES

INVENTOR
Oscar F. Bledsoe Jr.
BY
Munn & Co
ATTORNEYS

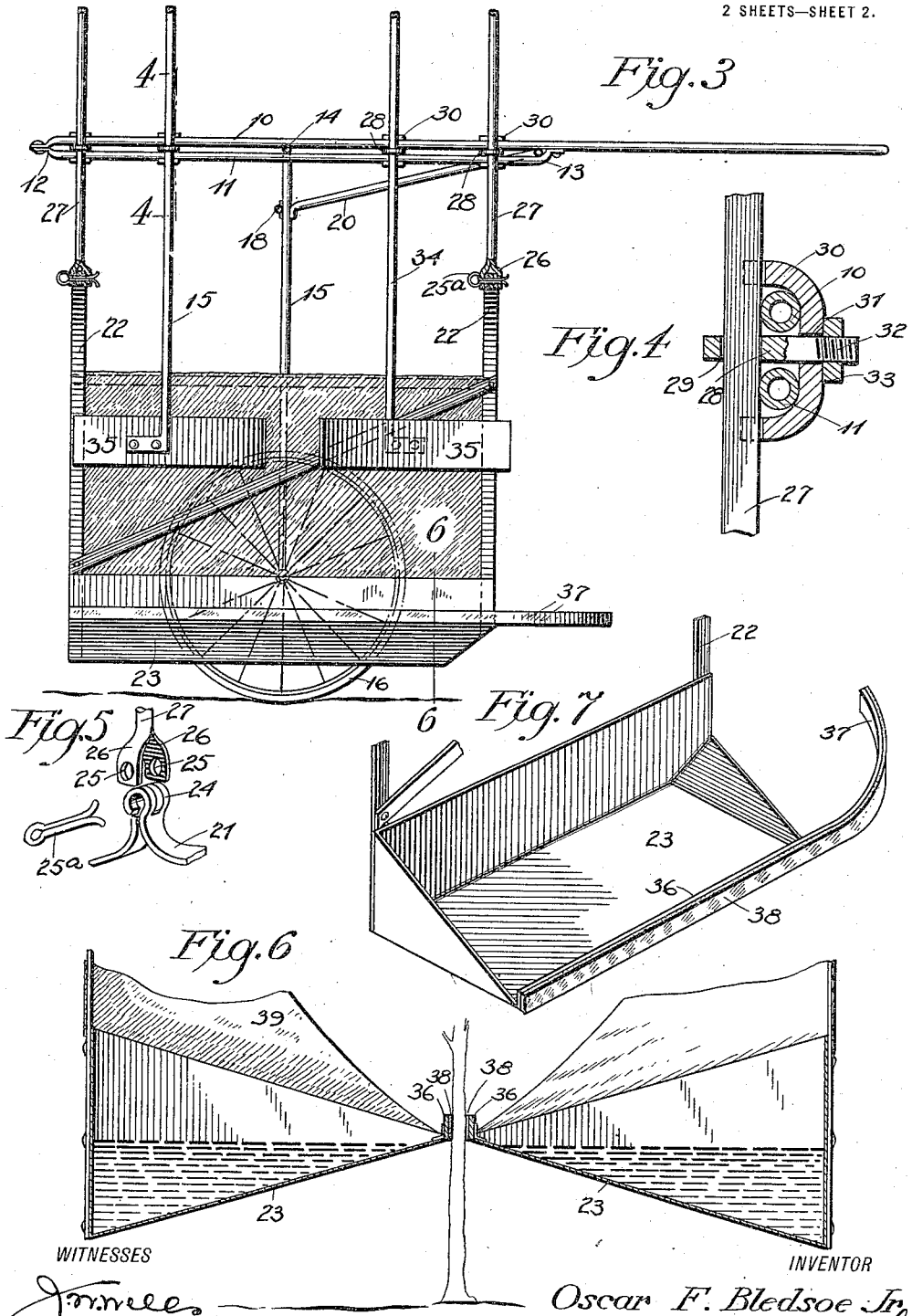

UNITED STATES PATENT OFFICE.

OSCAR F. BLEDSOE, JR., OF SHELLMOUND, MISSISSIPPI.

MACHINE FOR CATCHING BOLL-WEEVILS.

1,151,437. Specification of Letters Patent. Patented Aug. 24, 1915.

Application filed September 22, 1914. Serial No. 862,887.

*To all whom it may concern:*

Be it known that I, OSCAR F. BLEDSOE, Jr., a citizen of the United States, and a resident of Shellmound, in the county of Leflore and State of Mississippi, have invented a new and Improved Machine for Catching Boll-Weevils, of which the following is a full, clear, and exact description.

My invention has for its object to provide a machine for catching boll weevils, having means for readily adjusting the height of the pans which are held yieldingly spaced apart to pass at each side of the plant stems, the pans being pivoted to swing together laterally as occasion may require.

Another object of the invention is to provide obliquely disposed baffle plates to swing the plants from side to side above the pans for shaking the boll weevils from the plants, so that they may fall into the pans as the machine is moved forwardly; the baffle plates are so disposed that while they will engage the plants to shake the boll weevils therefrom, they will not injure the plants.

Additional objects of the invention will appear in the following specification in which the preferred form of my invention is described.

In the drawings similar reference characters refer to similar parts in all the views in which—

Figure 2:
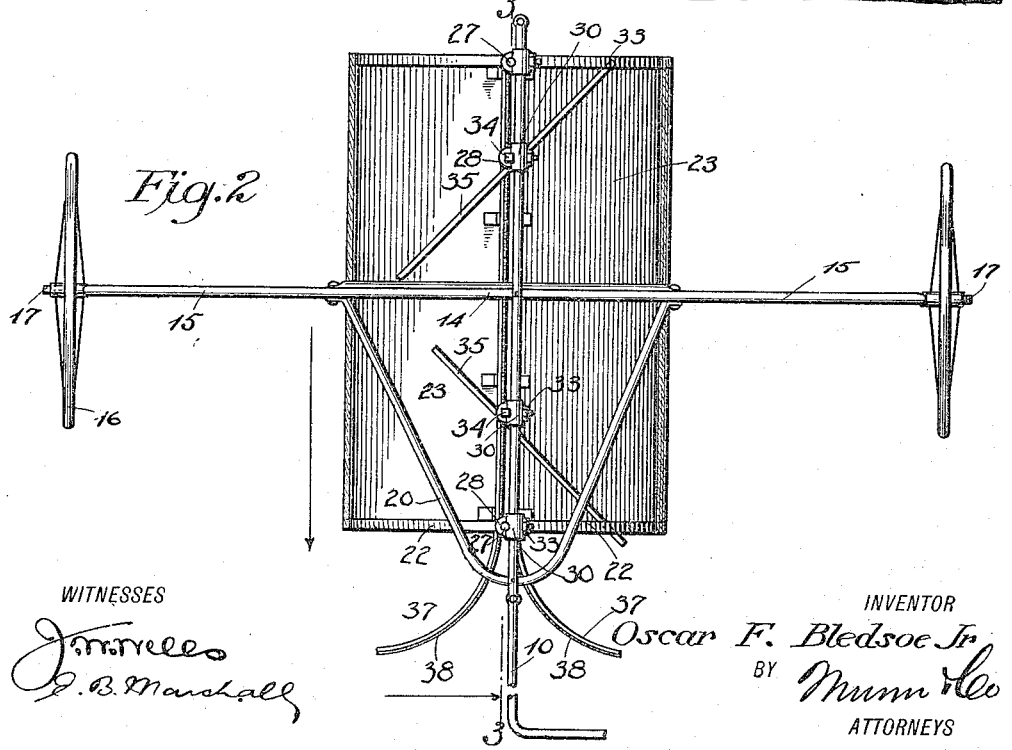

Figure 1 is a front elevation of my invention; Fig. 2 is a plan view of Fig. 1; Fig. 3 is a section view on the line 3—3 of Fig. 2; Fig. 4 is an enlarged section view on the line 4—4 of Fig. 3; Fig. 5 is a fragmentary view showing how the resilient arms for supporting the pans are pivotally mounted on the frame; Fig. 6 is a sectional view on the line 6—6 of Fig. 3; Fig. 7 is a perspective view showing one of the pans.

By referring to the drawings it will be seen that a longitudinally extending frame member 10 is provided, and disposed under this frame member 10 there is a companion frame member 11, the ends 12 and 13 of the companion frame member 11 being bent in the direction of frame member 10 to which they are riveted, the central portion of the frame members 10 and 11 being spaced apart, as best shown in Fig. 1 in the drawings. Disposed transversely between the frame member 10 and 11 and clamped thereby, there is a frame member 14 which has depending legs 15 which diverge as shown in Fig. 1 of the drawings, supporting wheels 16 being mounted on axles 17 which extend horizontally from the lower terminals and the said legs 15.

The legs 15 are connected by a transverse brace 18 which is secured to the said legs at 19, a frame member 20 being also secured to the legs 15 at 19; the frame member 20 extending upwardly and forwardly and is clamped between the frame members 10 and 11 adjacent the end 13 of the frame member. In this manner a light but durable frame is cheaply constructed. The two members 21 having the resilient arms 22 for supporting the pans 23 are provided with eyes which register with the orifices 25 in the bifurcated ends 26 of the rods 27 which extend vertically at one side of the frame members 10 and 11; cotter pins 25$^a$ extend through the eyes 24 at the orifices 25. The rods 27 are held in adjusted position relative to the frame members 10 and 11 by eye bolts 28, through the eyes 29 of which the rods 27 are disposed, clamps 30 being provided and having openings 31 through which the bolts 28 extend. Nuts 33 mesh with the threads 32 on the bolts 28 for pressing against the clamps 30 so that the frame members 10 and 11 will be clamped between the rods 27 and the clamps 30. In this manner the members 21 having the resilient arms, which have been described, are supported. The rods 34 are supported in a similar manner by similar eye bolts 28 and clamps 30 which coöperate with the frame members 10 and 11 and which permit the vertical adjustment of the rods 34 which support the baffle plates 35.

As has been stated the members 21 have depending resilient arms 22 which are secured to the outer sides of the pans 23 for supporting the said pans. These pans are spaced apart and are provided on their inner sides with the buffer members 36, the forward ends of which are curved outwardly at 37 to lead the stems of the plants between the pans 23.

To the faces of the buffer members 36 there is preferably secured cloth strips 38 to prevent injury to the plant stems and to the outer sides and ends of the pans 23 there is secured a hood 39 which is supported by the resilient arms 22. Not only is it possible for the pans 23 to move to and from each other to make certain that the progress of the machine will not be obstructed while the pans will be held as close as possible to the plant stems by the resiliency of the arms 22, but it is also possible for the pans 23 to swing laterally as shown by the dotted lines in Fig. 1 of the drawings so that the machine may move without interruption, although the line of plants may be irregular. As has been stated the baffle plates 35 are supported by the rods 34.

These baffle plates are disposed horizontally and obliquely relatively to the center line of the machine. The baffle plates being preferably disposed as shown in Fig. 2 of the drawings where they are spaced above the adjacent sides of the pans 23 and diverge laterally toward the outer side of one of the pans. With this construction the plant stems will be engaged by the forward baffle plate and will be pushed to one side thereby until the forward baffle plate passes the plants when they will be immediately engaged by the second baffle plate to be quickly pushed to the other side of the machine, thereby giving each plant a severe shaking which will cause the boll weevils to fall therefrom into the pans 23, in which may be deposited any desired substance to kill the boll weevils, or to prevent their escape from the pans.

The drawings show the rods 34 are angular in cross section so that they will hold the baffle plates 35 at the proper angle when adjusted and clamped at the proper height.

The pans 23 have their bottoms extending upwardly toward the center line of the machine to conform to the elevated rows that cotton is planted in. The front of each of the pans 23 is inclined to pass over obstacles.

It will be understood that the baffle plates 35 engage the plant stems to move the plates laterally against the pans 23, thereby pushing the pans 23 laterally so that when the plant stems are freed by each baffle plate the plants will spring back and forth laterally against and under the influence of the pans 23 to shake the boll weevils into the pans 23.

Having thus described my invention, I claim as new and desire to secure by Letters Patent:—

1. In a machine of the class described, a frame, two pans spaced apart for engaging opposite sides of the plant stems, pivotal means carried by the frame for supporting the pans, and a baffle plate supported by the frame and normally disposed obliquely over a side of a pan for engaging the plant stems to move the plants laterally against the pans, thereby pushing the pans laterally so that when the plant stems are freed by the baffle plate, the plants will spring back and forth laterally against and under the influence of the pans for the purpose specified.

2. In a machine of the class described, a frame, two pans spaced apart for engaging opposite sides of a row of plant stems, pivotal means carried by the frame for supporting the pans, the pivotal means permitting the pans to move relatively to each other, two horizontally disposed baffle plates, one disposed in front of the other and at an angle relatively thereto, the baffle plates being normally disposed, each over an adjacent side of a pan for engaging the plant stems to move the plants laterally and against the pans, thereby pushing the pans laterally so that when the plant stems are freed by the baffle plate the plants will spring back and forth laterally against and under the influence of the pans for the purpose specified.

3. In a machine of the class described, a frame, two pans spaced apart for engaging opposite sides of plant stems, resilient means carried by the frame for supporting the pans, and a baffle plate supported by the frame and normally disposed obliquely over a side of a pan for engaging the plant stems to move the plants laterally against a pan, thereby pushing the pan laterally so that when the plant stems are freed by the baffle plate the plants will spring back and forth laterally against and under the influence of the pans for the purpose specified.

4. In a machine of the class described, a longitudinally extending frame member, a transverse frame member having depending legs, a brace connecting the legs, a frame member secured to the legs and extending upwardly and forwardly, means for securing the third frame member to the first frame member, wheels mounted on the legs, two pairs of arms, means for supporting the arms on the first frame member, and two pans spaced apart and carried by the arms.

5. In a machine of the class described, a longitudinally extending frame member, a transverse frame member having depending legs, a frame member secured to the legs and extending forwardly, means for securing the third frame member to the first frame member, wheels mounted on the legs, two pairs of arms, means for supporting the arms on the first frame member, and two pans spaced apart and carried by the arms.

In testimony whereof I have signed my name to this specification in the presence of two subscribing witnesses.

OSCAR F. BLEDSOE, Jr.

Witnesses:
W. B. FULKERSON,
R. S. WINGFIELD.

Copies of this patent may be obtained for five cents each, by addressing the "Commissioner of Patents, Washington, D. C."